United States Patent
Xiao

(10) Patent No.: US 12,101,251 B2
(45) Date of Patent: Sep. 24, 2024

(54) METHOD AND APPARATUS FOR SWITCHING LENGTH OF BIDIRECTIONAL FORWARDING DETECTION PACKET AND STORAGE MEDIUM

(71) Applicant: ZTE Corporation, Shenzhen (CN)

(72) Inventor: Min Xiao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 10 days.

(21) Appl. No.: 17/798,632

(22) PCT Filed: Dec. 2, 2020

(86) PCT No.: PCT/CN2020/133343
§ 371 (c)(1),
(2) Date: Aug. 10, 2022

(87) PCT Pub. No.: WO2021/164370
PCT Pub. Date: Aug. 26, 2021

(65) Prior Publication Data
US 2023/0155931 A1     May 18, 2023

(30) Foreign Application Priority Data
Feb. 20, 2020 (CN) .......................... 202010104826.8

(51) Int. Cl.
*H04L 45/00* (2022.01)
*H04L 41/0604* (2022.01)
*H04L 45/42* (2022.01)

(52) U.S. Cl.
CPC ........ *H04L 45/566* (2013.01); *H04L 41/0627* (2013.01); *H04L 45/42* (2013.01)

(58) Field of Classification Search
CPC ...... H04L 41/0604; H04L 45/00; H04L 45/42
(Continued)

(56) References Cited

U.S. PATENT DOCUMENTS

2010/0023632 A1* 1/2010 Liu .................. H04L 45/04
709/230
2015/0295909 A1* 10/2015 Jethanandani ...... H04L 63/1441
726/3
(Continued)

FOREIGN PATENT DOCUMENTS

| CN | 101252476 A | 8/2008 |
| CN | 101552703 A | * 10/2009 |

(Continued)

OTHER PUBLICATIONS

Machine translation of CN 101552703 to Chen et al. (Year: 2024).*
(Continued)

*Primary Examiner* — James E Springer
(74) *Attorney, Agent, or Firm* — CANTOR COLBURN LLP

(57) ABSTRACT

Provided are a method and an apparatus for switching a length of a Bidirectional Forwarding Detection (BFD) packet, and a storage medium. The method includes: in a case where a length of a current BFD packet needs to be switched to a preset length, sending a pre-switching packet independent of the current BFD packet to a second node, wherein a BFD session running in an asynchronous mode is established between a first node and the second node, and the pre-switching packet is used for notifying the second node that the length of the current BFD packet needs to be switched to the preset length; and in a case where an echo packet fed back by the second node in response to the pre-switching packet is received, performing an operation of switching the length of the current BFD packet.

20 Claims, 4 Drawing Sheets

(58) Field of Classification Search
USPC .................................................. 709/238–244
See application file for complete search history.

(56) References Cited

U.S. PATENT DOCUMENTS

| | | | | |
|---|---|---|---|---|
| 2016/0036694 | A1* | 2/2016 | Abdul | .................... H04L 43/10 |
| | | | | 370/244 |
| 2018/0198723 | A1* | 7/2018 | Attarwala | ............... H04L 47/36 |
| 2018/0351784 | A1* | 12/2018 | Mirsky | ................... H04L 45/50 |
| 2019/0109759 | A1 | 4/2019 | Govindan | |

FOREIGN PATENT DOCUMENTS

| | | | |
|---|---|---|---|
| CN | 101697626 A | | 4/2010 |
| CN | 106330588 A | | 1/2017 |
| JP | 2009231986 A | * | 10/2009 |

OTHER PUBLICATIONS

Machine translation of JP 2009231986 (Year: 2024).*
International Search Report for corresponding application PCT/CN2020/133343 filed Dec. 2, 2020; Mail date Feb. 25, 2021.
D. Katz< "Bidirectional Forwarding Detection", Jun. 30, 2010, XP055557637.
European Search Report for corresponding application EP20920194; Report dated Jun. 13, 2023.
Haas J. "Application of the BFD Echo Function for Path MTU Verification or Detection", Mar. 7, 2011, pp. 1-8, XP015074364.

* cited by examiner

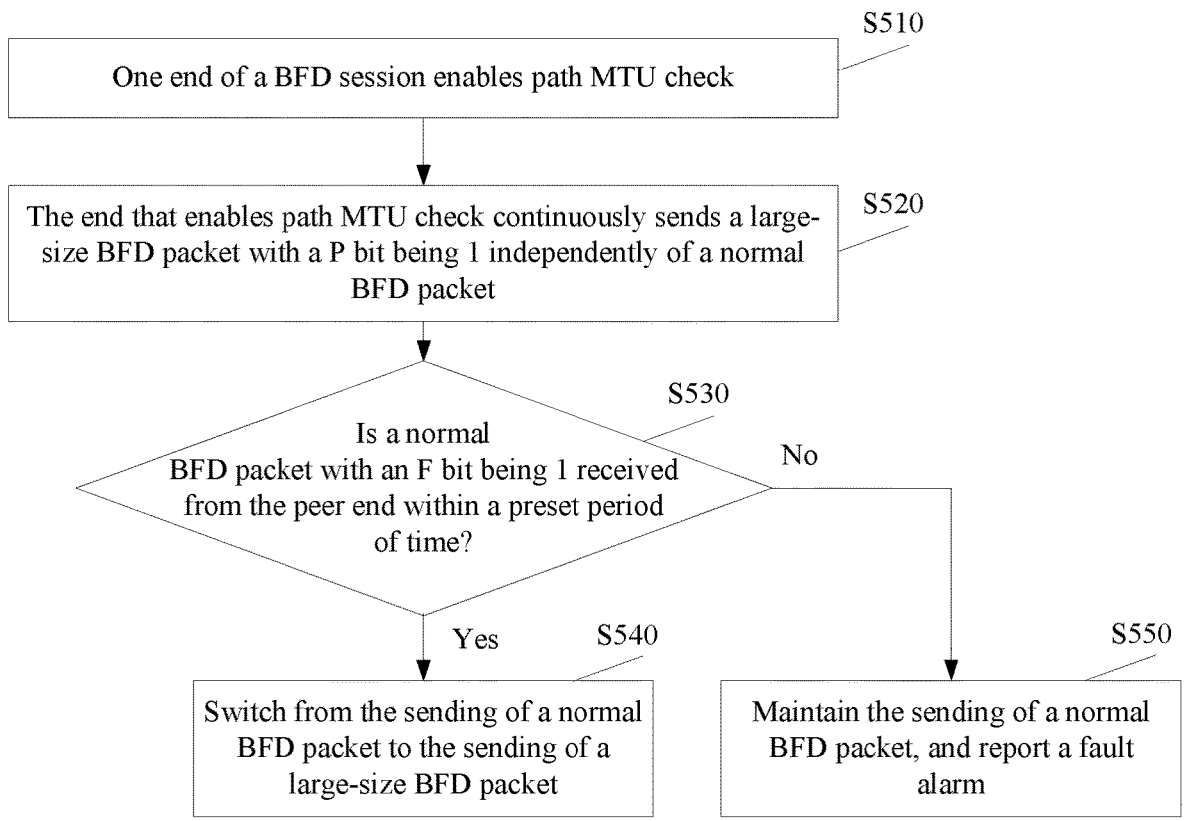

METHOD AND APPARATUS FOR SWITCHING LENGTH OF BIDIRECTIONAL FORWARDING DETECTION PACKET AND STORAGE MEDIUM

CROSS REFERENCE

This application is a National Stage Filing of PCT international Application No. PCT/CN2020/133343 filed on Dec. 2, 2020, which claims priority to Chinese Patent Application No. 202010104826.8, filed with the China Intellectual Property Administration (CNIPA) on Feb. 20, 2020, the disclosure of which is incorporated herein by reference in its entirety.

TECHNICAL FIELD

The present disclosure relates to a wired communication network, and for example, to a method and an apparatus for switching a length of a Bidirectional Forwarding Detection (BFD) packet, and a storage medium.

BACKGROUND

A Bidirectional Forwarding Detection (BFD) protocol running in an asynchronous mode allows large-size BFD packets to be sent between two ends of a BFD session for a Maximum Transmission Unit (MTU) check of a packet forwarding path. If a large-size BFD packet is sent at one end of the BFD session, but the peer end of the BFD session does not support processing of the large-size BFD packet, the peer end directly discards the received large-size BFD packet, which may cause the BFD session to be interrupted.

SUMMARY

Provided are a method and an apparatus for switching a length of a BFD packet, and a storage medium, which can implement the switching of the length of the BFD packet, and at the same time prevent the BFD session from being interrupted.

Some embodiments of the present disclosure provide a method for switching a length of a BFD packet, including:
in a case where a length of a current BFD packet needs to be switched to a preset length, sending a pre-switching packet independent of the current BFD packet to a second node, wherein a BFD session running in an asynchronous mode is established between a first node and the second node, and the pre-switching packet is used for notifying the second node that the length of the current BFD packet needs to be switched to the preset length; and
in a case where an echo packet fed back by the second node in response to the pre-switching packet is received, performing an operation of switching the length of the current BFD packet.

Some embodiments of the present disclosure provide a method for switching a length of a BFD packet, including:
in a case of receiving a pre-switching packet sent by a first node, feeding back an echo packet to the first node in response to the pre-switching packet, wherein a BFD session running in an asynchronous mode is established between a second node and the first node, and the pre-switching packet is used for notifying the second node that a length of a current BFD packet needs to be switched to a preset length.

Some embodiments of the present disclosure provide an apparatus for switching a length of a BFD packet, including:
a first sending module, configured to send a pre-switching packet;
a first receiving module, configured to receive an echo packet; and
at least one processor, configured to:
in a case where a length of a current BFD packet needs to be switched to a preset length, send the pre-switching packet independent of the current BFD packet to a second node, wherein a BFD session running in an asynchronous mode is established between a first node and the second node, and the pre-switching packet is used for notifying the second node that the length of the current BFD packet needs to be switched to the preset length; and
perform an operation of switching the length of the current BFD packet in a case where the echo packet fed back by the second node in response to the pre-switching packet is received.

Some embodiments of the present disclosure provide an apparatus for switching a length of a BFD packet, including:
a second receiving module, configured to receive a pre-switching packet;
a second sending module, configured to send an echo packet; and
at least one processor, configured to:
in a case of receiving the pre-switching packet sent by a first node, feeding back the echo packet to the first node in response to the pre-switching packet, wherein a BFD session running in an asynchronous mode is established between a second node and the first node, and the pre-switching packet is used for notifying the second node that a length of a current BFD packet needs to be switched to a preset length.

Some embodiments of the present disclosure provide a storage medium. The storage medium stores a computer program. The computer program implements any method in the embodiments of the present disclosure when being executed by a processor.

In the embodiments of the present disclosure, a first node sends a pre-switching packet to a second node, thereby realizing the switching of the length of the BFD packet, and at the same time, a BFD session is prevented from being interrupted.

With respect to the above and other aspects of the present disclosure and implementations thereof, further description is provided in the brief description of the drawings, the detailed description of the embodiments and the claims.

BRIEF DESCRIPTION OF THE DRAWINGS

FIG. 4 is a flowchart of a method for switching a length of a BFD packet according to the embodiments of the present disclosure;

FIG. 5 is a flowchart of a method for switching a length of a BFD packet according to the embodiments of the present disclosure;

DETAILED DESCRIPTION OF THE EMBODIMENTS

Embodiments of the present disclosure will be described hereinafter with reference to the drawings. It is important to note that the embodiments in the present disclosure and characteristics in the embodiments can be combined arbitrarily without conflicts.

The BFD fundamental protocol defined by the Internet Engineering Task Force (IETF) standard Request For Comments (RFC) 5880 describes two operating modes for implementing bidirectional forwarding detection after a BFD session is successfully established, and the two operating modes are respectively an asynchronous mode and a demand mode.

In the asynchronous mode, network nodes at two ends of the BFD session periodically send a BFD packet to each other, and if one end of the BFD session does not receive the BFD packet sent by the peer end within a certain detection time, this end announces that the BFD session is switched from an Up state to a Down state, and may trigger subsequent operations such as protection switching.

In the demand mode, both ends of the BFD session have an independent method to confirm connectivity between the two ends. The two ends of the BFD session do not periodically send a BFD packet to each other. Only when one end enables connectivity check as required, a group of BFD packets is sent to the peer end, and the peer end replies to the group of BFD packets. If the sending end does not receive the echo packet returned by the peer end within a certain detection time, the sending end announces that the BFD session is switched from an Up state to a Down state, and may trigger subsequent operations such as protection switching.

Figure 1:
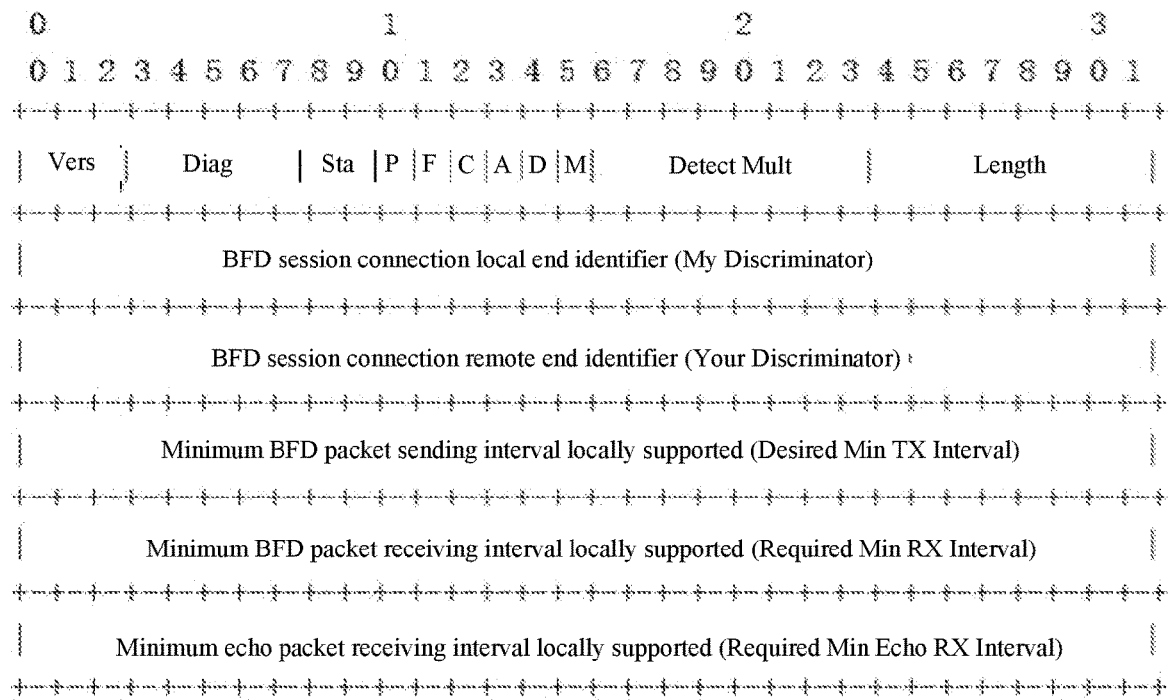
FIG. 1 is a schematic diagram of an encapsulation format of a mandatory fixed-size packet segment of a normal BFD packet according to the embodiments of the present disclosure.
Figure 2:
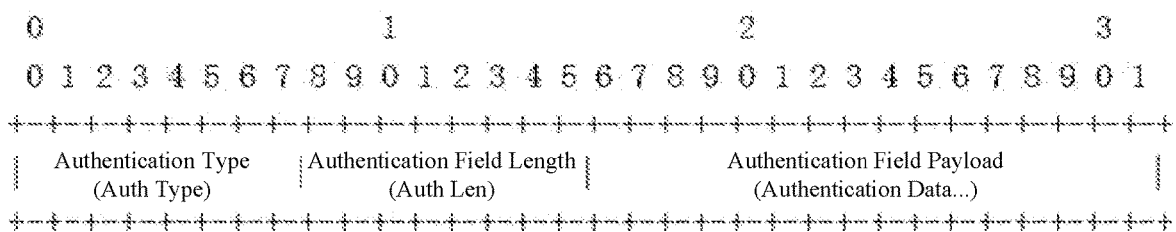
FIG. 2 is a schematic diagram of an encapsulation format of an optional secure authentication packet segment of a normal BFD packet according to the embodiments of the present disclosure.

The BFD fundamental protocol defined by the IETF standard RFC 5880 specifies that a BFD packet includes a mandatory fixed-size packet segment and an optional secure authentication packet segment. The length of the mandatory fixed-size packet segment is 24 bytes, and the encapsulation format of the mandatory fixed-size packet segment is as shown in FIG. 1. In the encapsulation format, the A bit is used for identifying whether the BFD packet includes an optional secure authentication packet segment, the A bit being 1 indicates that the BFD packet includes an optional secure authentication packet segment, and the A bit being 0 indicates that the BFD packet does not include an optional secure authentication packet segment. The length of the optional secure authentication packet segment is not fixed, and varies according to different selected secure authentication mechanisms, and the length ranges from 2 bytes to 28 bytes. The encapsulation format of the optional secure authentication packet segment is as shown in FIG. 2. To sum up, the BFD fundamental protocol defined in RFC 5880 only allows the size of the BFD packet to vary in a very small range, with the minimum size being 24 bytes, and the maximum size being 52 bytes. The BFD packet specified by the RFC 5880 is referred to as a normal BFD packet in the embodiments of the present disclosure, and its size limitation makes the BFD fundamental protocol unable to be used for MTU check of the packet forwarding path. In order to break through the size limitation of a normal BFD packet, the IETF standard proposal draft-ietf-bfd-large-packets proposes a large-size BFD packet, and by adding padding behind the normal BFD packet, the size of the normal BFD packet can be greatly increased, thereby obtaining a large-size BFD packet, so as to satisfy the purpose of using a BFD protocol to perform MTU check of a packet forwarding path.

The BFD fundamental protocol defined by the IETF standard RFC 5880 allows the BFD session operating in the asynchronous mode to modify the BFD protocol parameters through a announce/reply (Poll/Final) mechanism during running. For example, in a case where one end of a BFD session needs to modify a sending interval of a BFD packet, a Desired Min TX Interval field in the BFD packet sent by the end according to an original interval is modified into a new sending interval; meanwhile, a P bit in the BFD packet is set to 1 to announce to the peer that the sending interval needs to be modified. After receiving the BFD packet which includes the new sending interval and includes a P bit being 1, the peer immediately returns a BFD packet with an F bit being 1 as a response. The BFD packet returned by the peer is independent of other BFD packets periodically sent by the peer. Once receiving, from the peer, the BFD packet with the F bit being 1, the announcing end immediately stops sending the BFD packet with the P bit being 1 and resumes transmission of the BFD packet with the P bit being 0; otherwise, the peer continuously sends the BFD packet with the P bit being 1.

The embodiment of the present disclosure changes the modification mechanism of the BFD protocol parameters specified in the RFC 5880, and is applied to a process of switching from a normal BFD packet to a large-size BFD packet, thereby overcoming the problem that a BFD session is interrupted due to the described switching process in a case where a receiving end of the BFD session does not support the processing of a large-size BFD packet.

Figure 3:
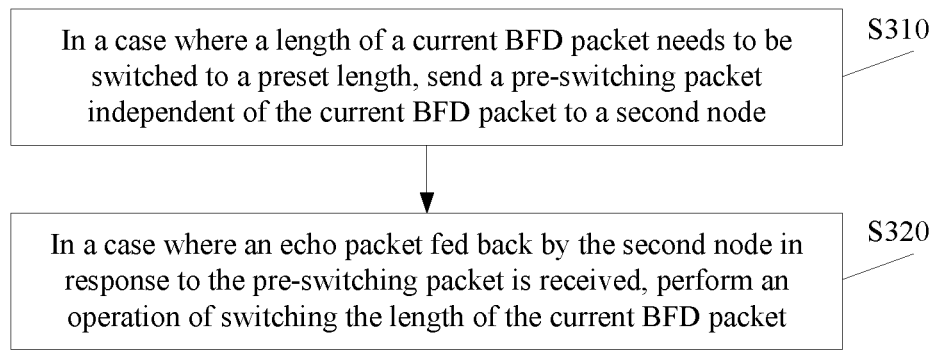
FIG. 3 is a flowchart of a method for switching a length of a BFD packet according to the embodiments of the present disclosure.

In an embodiment of the present disclosure, FIG. 3 shows a flowchart of a method for switching a length of a BFD packet, and the method includes operations S310 and S320 which are described below.

At S310, in a case where a length of a current BFD packet needs to be switched to a preset length, a pre-switching packet independent of the current BFD packet is sent to a second node.

At S320, an operation of switching the length of the current BFD packet is performed in a case where an echo packet fed back by the second node in response to the pre-switching packet is received.

A BFD session running in an asynchronous mode is established between a first node and the second node. The pre-switching packet is used for notifying the second node that the length of the current BFD packet needs to be switched to the preset length. The first node serves as a local node initiating the switching of the length of the BFD packet. In a case where the switching of the length of the BFD packet needs to be performed, for example, in a case where a preset length is greater than the length of the current BFD packet, the first node needs to send a pre-switching packet to the second node, i.e. a peer node of the BFD session. In a case where the second node is able to process the pre-switching packet, the second node immediately feeds back an echo packet after receiving the pre-switching packet. In this way, the first node can determine that the second node is able to process the pre-switching packet, and then can perform an operation of switching the length of the current BFD packet, so as to switch the current BFD packet to a BFD packet with the preset length. Since the BFD packet with the preset length will not be discarded at the second node which is able to process the pre-switching packet, the BFD session will not be interrupted.

In an implementation, in the case where the length of the current BFD packet needs to be switched to the preset length, sending the pre-switching packet independent of the current BFD packet to the second node includes the following operation: the pre-switching packet is sent to the second node in a case where a Maximum Transmission Unit (MTU) check of a packet forwarding path is enabled, wherein a packet length of the pre-switching packet is the preset length, a first preset bit of the pre-switching packet is set to a first preset value, and the length of the current BFD packet is less than the preset length.

In a case where MTU check of the packet forwarding path needs to be performed, the first node needs to send a large-size BFD packet whose length is greater than that of a normal BFD packet. In this case, the first node sends a pre-switching packet independent of the current BFD packet to the second node. Furthermore, the preset length is greater than the length of the current BFD packet. Based on an announce/reply (Poll/Final) mechanism, a first preset bit in a pre-switching packet is set to a first preset value for notifying the second node to respond to the pre-switching packet, so that the second node feeds back an echo packet. A second preset bit of the echo packet fed back by the second node is set to a first preset value.

In an implementation, a P bit of the pre-switching packet is set to 1.

In an implementation, performing the operation of switching the length of the current BFD packet includes: replacing the current BFD packet with a length switched BFD packet, wherein the length of the length switched BFD packet is the preset length. After receiving the echo packet fed back by the second node, the first node can determine that a condition of switching the length of the BFD packet is satisfied, and therefore the first node replaces the current BFD packet with a length switched BFD packet, and continues to send the length switched BFD packet according to the sending interval of the current BFD packet, where the P bit of the length switched BFD packet is set to 0.

In an implementation, after sending the pre-switching packet independent of the current BFD packet to the second node in the case where the length of the current BFD packet needs to be switched to the preset length, the method further includes: reporting corresponding fault alarm information in a case where the echo packet fed back by the second node in response to the pre-switching packet is not received within a preset time.

In a case where the first node sends the pre-switching packet, an interval for sending the pre-switching packet may be preset, and the interval is independent of a sending interval of the current BFD packet, but may be greater than the sending interval of the current BFD packet. If no echo packet fed back by the second node in response to the pre-switching packet is received within a preset time, it represents that the condition for switching the BFD packet to the length switched BFD packet with the preset length is not satisfied currently, and alarm information indicating that the switching of the length of the BFD packet fails needs to be reported to the network management system. Optionally, the preset time is 3 to 5 times of the interval of the pre-switching packet.

In an embodiment of the present disclosure, FIG. 4 shows a flowchart of a method for switching a length of a BFD packet. The method includes an operation S410 which is described below.

At S410, in a case of receiving a pre-switching packet sent by a first node, an echo packet is fed back to the first node in response to the pre-switching packet.

A BFD session running in an asynchronous mode is established between a second node and the first node. The pre-switching packet is used for notifying the second node that a length of a current BFD packet needs to be switched to a preset length. In a case where the second node is able to process the pre-switching packet, the second node immediately feeds back an echo packet after receiving the pre-switching packet, so as to notify the first node that the switching of the length of the BFD packet can be performed, and the BFD packet is switched to a BFD packet with the preset length.

In an implementation, a second preset bit of the echo packet is set to a first preset value.

Based on an announce/reply (Poll/Final) mechanism, a first preset bit of the received pre-switching packet is set to a first preset value, which notifies the second node to respond to the pre-switching packet. As a response, a second preset bit of the echo packet fed back by the second node is set to the first preset value.

In an implementation, an F bit of the echo packet is set to 1.

In an exemplary embodiment, FIG. 5 shows a flowchart of a method for switching a length of a BFD packet, and the method includes operations S510 to S550 which are described below.

At S510, two ends of a BFD session periodically send normal BFD packets to each other, wherein one of the two ends enables MTU check of a packet forwarding path, and sent BFD packets need to be switched from normal BFD packets to large-size BFD packets.

At S520, after one end of the BFD session enables the path MTU check, within a preset period of time, a large-size BFD packet with a P bit being 1 is continuously sent independently of normal BFD packets that are periodically sent. Here, the purpose of sending the normal BFD packets and the large-size BFD packet with the P bit being 1 at the same time is to keep the BFD session not interrupted during a switching process. If the normal BFD packet is replaced with the large-size BFD packet with the P bit being 1 during the switching process like the modification mechanism for the BFD protocol parameters specified in RFC S880, in a case where the peer end does not support processing of the large-size BFD packet, the BFD session will be interrupted. The frequency at which the end that enables the path MTU check sends the large-size BFD packet with the P bit being 1 may be determined according to the sending capability of the local end.

At S530, the end that enables the path MTU check judges whether a normal BFD packet with the F bit being 1 is received from the peer end within a preset period of time. After receiving the large-size BFD packet with the P bit being 1, the peer end of the BFD session immediately returns a normal BFD packet with the F bit being 1 as a response. Herein, the purpose of returning the normal BFD packet with the F bit being 1 instead of returning the large-size BFD packet with the F bit being 1 is to prevent the echo packet from losing because the length of the returned large-size BFD packet exceeds the MTU of the reverse packet forwarding path. Meanwhile, the peer end receives the normal BFD packet continuously to ensure that the BFD session is not interrupted.

At S540, if the end that enables the path MTU check receives from the peer end the normal BFD packet with the F bit being 1, it represents that the switching process is successful, and the normal BFD packet is replaced with the large-size BFD packet with the P bit being 0, and the sending interval is the same as the original sending interval.

At S550, after a preset period of time, if the end that enables the path MTU check does not receive from the peer end the normal BFD packet with the F bit being 1, the end reports a fault alarm, and continues to periodically send the normal BFD packet with the P bit being 0. There are two cases in which the end that enables the path MTU check does not receive from the peer end the normal BFD packet with the F bit being 1, one is because the peer end does not support processing of a large-size BFD packet, and the other is because the length of the large-size BFD packet exceeds the MTU of the packet forwarding path, either of which results in that the normal BFD packet with the F bit being 1 and returned by the peer end is not received.

In two ends of the BFD session, before switching to the large-size BFD packet, one end that enables the path MTU check sends a large-size BFD packet, whose P bit is set to 1, independent of a normal BFD packet, and judges the feasibility of switching to the large-size BFD packet according to whether a normal BFD packet with the F bit being 1 is received from the peer end, and the BFD session is kept uninterrupted between the two ends.

Figure 6:
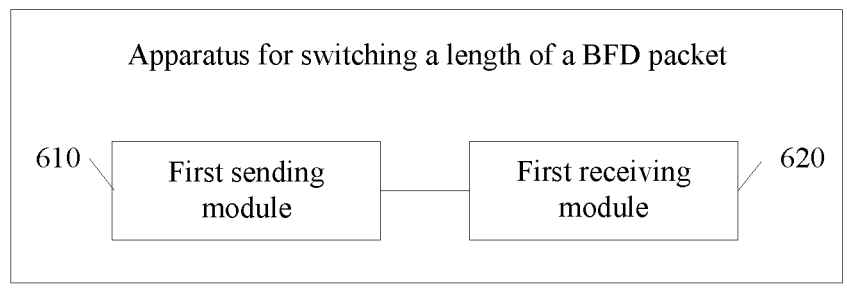
FIG. 6 is a schematic structural diagram of an apparatus for switching a length of a BFD packet according to the embodiments of the present disclosure.

In an embodiment of the present disclosure, FIG. 6 shows an apparatus for switching a length of a BFD packet. The apparatus includes: a first sending module 610, configured to send a pre-switching packet; a first receiving module 620, configured to receive an echo packet; and at least one processor, configured to: in a case where a length of a current BFD packet needs to be switched to a preset length, send the pre-switching packet independent of the current BFD packet to a second node, wherein a BFD session running in an asynchronous mode is established between a first node and the second node, and the pre-switching packet is used for notifying the second node that the length of the current BFD packet needs to be switched to the preset length; and perform an operation of switching the length of the current BFD packet in a case where the echo packet fed back by the second node in response to the pre-switching packet is received.

In an implementation, in the case where the length of the current BFD packet needs to be switched to the preset length, sending the pre-switching packet independent of the current BFD packet to the second node includes the following operation: the pre-switching packet is sent to the second node in a case where an MTU check of a packet forwarding path is enabled, wherein a packet length of the pre-switching packet is the preset length, a first preset bit of the pre-switching packet is set to a first preset value, and the length of the current BFD packet is less than the preset length.

In an implementation, a P bit of the pre-switching packet is set to 1.

In an implementation, performing the operation of switching the length of the current BFD packet includes: replacing the current BFD packet with a length switched BFD packet, wherein the length of the length switched BFD packet is the preset length.

In an implementation, after sending the pre-switching packet independent of the current BFD packet to the second node in the case where the length of the current BFD packet needs to be switched to the preset length, the method further includes: reporting corresponding fault alarm information in a case where the echo packet fed back by the second node in response to the pre-switching packet is not received within a preset time.

Figure 7:
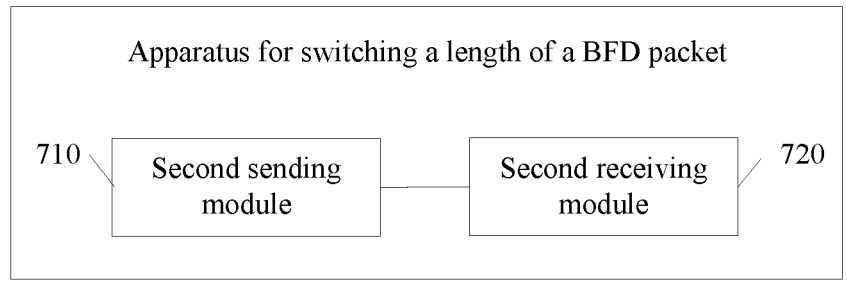
FIG. 7 is a schematic structural diagram of an apparatus for switching a length of a BFD packet according to the embodiments of the present disclosure.

In an embodiment of the present disclosure, FIG. 7 shows an apparatus for switching a length of a BFD packet. The apparatus includes: a second receiving module 710, configured to receive a pre-switching packet; a second sending module 720, configured to send an echo packet; and at least one processor, configured to: in a case of receiving the pre-switching packet sent by a first node, feeding back the echo packet to the first node in response to the pre-switching packet, wherein a BFD session running in an asynchronous mode is established between a second node and the first node, and the pre-switching packet is used for notifying the second node that a length of a current BFD packet needs to be switched to a preset length.

In an implementation, a second preset bit of the echo packet is set to a first preset value.

In an implementation, an F bit of the echo packet is set to 1.

The embodiments of the present disclosure provide a storage medium. The storage medium stores a computer program. When the computer program is executed by a processor, any method in the embodiments of the present disclosure is implemented.

The foregoing descriptions are merely exemplary embodiments of the present disclosure, but are not intended to limit the scope of protection of the present disclosure.

Those having ordinary skill in the art will appreciate that the term user terminal encompasses any suitable type of wireless user equipment, such as a mobile telephone, a portable data processing device, a portable web browser, or an in-vehicle mobile station.

In general, the various embodiments of the present disclosure may be implemented in hardware or special purpose circuits, software, logic, or any combination thereof. For example, some aspects may be implemented in hardware, while other aspects may be implemented in firmware or software that may be executed by a controller, microprocessor or other computing device, although the present disclosure is not limited thereto.

The embodiments of the present disclosure may be implemented by execution of computer program instructions by a data processor of a mobile device, such as in a processor entity, or by hardware, or by a combination of software and hardware. The computer program instructions may be assembly instructions, Instruction Set Architecture (ISA) instructions, machine instructions, machine-related instructions, microcode, firmware instructions, state setting data, or source or object code written in any combination of one or more programming languages.

The block diagrams of any logic flow in the figures of the present disclosure may represent program operations, or may represent interconnected logic circuits, modules, and functions, or a combination of program steps and logic circuits, modules, and functions. The computer program may be stored on a memory. The memory may be of any type suitable to the local technical environment and may be implemented using any suitable data storage technology, such as, but not limited to, Read-Only Memory (ROM), Random Access Memory (RAM), optical memory devices and systems (Digital Video Disc (DVD) or Compact Disk (CD)), etc. Computer-readable media may include non-transitory storage media. The data processor may be of any type suitable to the local technical environment, such as, but not limited to, a general purpose computer, a special purpose computer, a microprocessor, a Digital Signal Processor (DSP), an Application Specific Integrated Circuit (ASIC), a Field-Programmable Gate Array (FPGA), and a processor based on a multi-core processor architecture.

What is claimed is:

1. A method for switching a length of a Bidirectional Forwarding Detection (BFD) packet, performed by a first node and comprising:
   in a case where a length of a BFD packet needs to be switched from a first length to a second length, sending a pre-switching packet whose packet length is the second length to a second node, while sending a BFD packet whose packet length is the first length to the second node so as to keep a BFD session uninterrupted during a switching process, wherein the BFD session running in an asynchronous mode is established between the first node and the second node, and the pre-switching packet is used for notifying the second node that the length of the BFD packet needs to be switched to the second length; and
   in a case where an echo packet fed back by the second node in response to the pre-switching packet is received, determining that the second node is able to process a BFD packet whose packet length is the second length, stopping sending the BFD packet whose packet length is the first length to the second node, and starting sending the BFD packet whose packet length is the second length to the second node.

2. The method according to claim 1, wherein in a case where a length of a BFD packet needs to be switched from a first length to a second length, sending a pre-switching packet whose packet length is the second length to a second node comprises:
   sending the pre-switching packet to the second node in a case where a Maximum Transmission Unit (MTU) check of a packet forwarding path is enabled, wherein a first preset bit of the pre-switching packet is set to a first preset value, and the first length is less than the second length.

3. The method according to claim 2, wherein a P bit of the pre-switching packet is set to 1.

4. The method according to claim 1, wherein stopping sending the BFD packet whose packet length is the first length to the second node, and starting sending the BFD packet whose packet length is the second length to the second node comprises:
   replacing the BFD packet with a length switched BFD packet, wherein the length of the length switched BFD packet is the second length.

5. The method according to claim 1, wherein after sending a pre-switching packet whose packet length is the second length to a second node in a case where a length of a BFD packet needs to be switched from a first length to a second length, the method further comprises:
   reporting corresponding fault alarm information in a case where the echo packet fed back by the second node in response to the pre-switching packet is not received within a preset time.

6. A non-transitory computer-readable storage medium, storing a computer program, wherein the computer program implements the method according to claim 1 when being executed by a processor.

7. The method according to claim 1, wherein
   in a case of sending the pre-switching packet, an interval for sending the pre-switching packet whose packet length is the second length is independent of a sending interval of the BFD packet whose packet length is the first length.

8. The method according to claim 7, wherein the interval for sending the pre-switching packet whose packet length is the second length is greater than the sending interval of the BFD packet whose packet length is the first length.

9. The method according to claim 5, wherein the preset time is 3 to 5 times of an interval for sending the pre-switching packet.

10. A method for switching a length of a Bidirectional Forwarding Detection (BFD) packet, performed by a second node and comprising:
    receiving a BFD packet whose packet length is a first length from a first node, and receiving a pre-switching packet whose packet length is a second length from the first node, wherein a BFD session running in an asynchronous mode is established between the second node and the first node, and the pre-switching packet is used for notifying the second node that the length of the BFD packet needs to be switched to the second length;
    processing the BFD packet whose packet length is the first length so as to keep the BFD session uninterrupted during a switching process, and processing the pre-switching packet whose packet length is the second length;
    when the second node is able to process the pre-switching packet whose packet length is the second length,
    feeding back an echo packet to the first node in response to the pre-switching packet, so as to notify the first node that the second node is able to process the BFD packet whose packet length is the second length, and trigger the first node to stop sending the BFD packet whose packet length is the first length and starts sending the BFD packet whose packet length is the second length.

11. The method according to claim 10, wherein a second preset bit of the echo packet is set to a first preset value.

12. The method according to claim 11, wherein an F bit of the echo packet is set to 1.

13. An apparatus for switching a length of a Bidirectional Forwarding Detection (BFD) packet, arranged on a second node and comprising a memory storing instructions and a processor in communication with the memory, wherein the processor is configured to execute the instructions to implement the method according to claim 10.

14. A non-transitory computer-readable storage medium, storing a computer program, wherein the computer program implements the method according to claim 10 when being executed by a processor.

15. An apparatus for switching a length of a Bidirectional Forwarding Detection (BFD) packet, arranged on a first node and comprising a memory storing instructions and a processor in communication with the memory, wherein the processor is configured to execute the instructions to:
    in a case where a length of a BFD packet needs to be switched from a first length to a second length, send a pre-switching packet whose packet length is the second length to a second node, while sending a BFD packet whose packet length is the first length to the second node so as to keep a BFD session uninterrupted during a switching process, wherein the BFD session running in an asynchronous mode is established between the first node and the second node, and the pre-switching packet is used for notifying the second node that the length of the BFD packet needs to be switched to the second length; and in a case where an echo packet fed back by the second node in response to the pre-switching packet is received, determine that the second node is able to process a BFD packet whose packet length is the second length, stop sending the BFD packet whose packet length is the first length to the second node, and start sending the BFD packet whose packet length is the second length to the second node.

16. The apparatus according to claim 15, wherein the processor is configured to execute the instructions to:
send the pre-switching packet to the second node in a case where a Maximum Transmission Unit (MTU) check of a packet forwarding path is enabled, wherein a first preset bit of the pre-switching packet is set to a first preset value, and the first length is less than the second length.

17. The apparatus according to claim 16, wherein a P bit of the pre-switching packet is set to 1.

18. The apparatus according to claim 15, wherein the processor is configured to execute the instructions to:
replace the BFD packet with a length switched BFD packet, wherein the length of the length switched BFD packet is the second length.

19. The apparatus according to claim 15, wherein the processor is configured to execute the instructions to, after sending a pre-switching packet whose packet length is the second length to a second node in a case where a length of a BFD packet needs to be switched from a first length to a second length:
report corresponding fault alarm information in a case where the echo packet fed back by the second node in response to the pre-switching packet is not received within a preset time.

20. The apparatus according to claim 15, wherein in a case of sending the pre-switching packet, an interval for sending the pre-switching packet whose packet length is the second length is independent of a sending interval of the BFD packet whose packet length is the first length.

\* \* \* \* \*